US008706273B2

(12) United States Patent
Brown et al.

(10) Patent No.: US 8,706,273 B2
(45) Date of Patent: Apr. 22, 2014

(54) APPARATUS AND METHOD FOR CONVEYING AUDIO SIGNALS FROM AN INPUT LOCUS TO AN OUTPUT LOCUS

(75) Inventors: Darrell Maurice Brown, Keller, TX (US); Douglas Scott Lane, Coppell, TX (US)

(73) Assignee: Radio Shack, Corp., Fort Worth, TX (US)

( * ) Notice: Subject to any disclaimer, the term of this patent is extended or adjusted under 35 U.S.C. 154(b) by 1054 days.

(21) Appl. No.: 12/608,816

(22) Filed: Oct. 29, 2009

(65) Prior Publication Data

US 2011/0106281 A1 May 5, 2011

(51) Int. Cl.
*G06F 17/00* (2006.01)

(52) U.S. Cl.
USPC .................. 700/94; 381/74; 381/86; 381/384

(58) Field of Classification Search
USPC ...................................... 381/384, 86; 700/94
See application file for complete search history.

(56) References Cited

U.S. PATENT DOCUMENTS

| | | | | |
|---|---|---|---|---|
| 3,689,709 | A * | 9/1972 | Salmansohn et al. | 381/151 |
| 4,358,738 | A * | 11/1982 | Kahn | 327/557 |
| 2006/0052144 | A1* | 3/2006 | Seil et al. | 455/575.1 |

OTHER PUBLICATIONS

Resolving Audio Hum Problems with the DXD, Top Ten Devices, Inc., http://www.qth.com/TopTen/apnote9.htm, retrieved from http://web.archive.org/web/20020428205519/http://www.qth.com/TopTen/apnote9.htm as it appeared online Apr. 28, 2002, hereinafter Top Ten Devices.*

* cited by examiner

*Primary Examiner* — Joseph Saunders, Jr.
(74) *Attorney, Agent, or Firm* — Donald D. Mondul; Daniel R. Brown

(57) ABSTRACT

An apparatus for conveying audio signals from an input locus to an output locus remote from the input locus includes: (a) a multi-pin unit configured for receiving at least three signal paths at the input locus, including at least two audio signal paths for conveying the audio signals and at least one ground path; (b) at least one cable unit coupled with the multi-pin unit, substantially spanning an interval between the multi-pin unit and the output locus, and presenting the at least three signal paths at the output locus; (c) a connector pin unit coupled with the at least one cable unit at the output locus, and presenting the at least three signal paths in a single-pin configuration; and (d) a filter unit coupled with the at least one cable unit for filtering at least one predetermined signal component from the at least two audio signal paths.

20 Claims, 4 Drawing Sheets

APPARATUS AND METHOD FOR CONVEYING AUDIO SIGNALS FROM AN INPUT LOCUS TO AN OUTPUT LOCUS

FIELD OF THE INVENTION

The present invention is directed to conveying audio signals, and especially to conveying audio signals conveniently with good clarity.

BACKGROUND OF THE INVENTION

Present day audio player units may be configured for coupling with amplified auxiliary audio units to permit higher volume earphone-free listening.

Some environments in which such auxiliary connections are effected may be electromagnetically noisy so that the final product includes interference, noise or other signal degradations.

It would be advantageous to have an apparatus and method for conveying audio signals from an input locus to an output locus that presents improved sound at an auxiliary sound unit and experiences reduced interference from electromagnetic audio noise present in the environment.

SUMMARY OF THE INVENTION

An apparatus for conveying audio signals from an input locus to an output locus remote from the input locus includes: (a) a multi-pin unit configured for receiving at least three signal paths at the input locus, including at least two audio signal paths for conveying the audio signals and at least one ground path; (b) at least one cable unit coupled with the multi-pin unit, substantially spanning an interval between the multi-pin unit and the output locus, and presenting the at least three signal paths at the output locus; (c) a connector pin unit coupled with the at least one cable unit at the output locus, and presenting the at least three signal paths in a single-pin configuration; and (d) a filter unit coupled with the at least one cable unit for filtering at least one predetermined signal component from the at least two audio signal paths.

A method for conveying audio signals from an input locus to an output locus remote from the input locus includes: (a) in no particular order: (1) providing a multi-pin unit configured for receiving at least three signal paths at the input locus; (2) providing at least one cable unit; the at least one cable unit presenting the at least three signal paths; (3) providing a connector pin; the connector pin unit presenting the at least three signal paths in a single-pin configuration; and (4) providing a filter unit; (b) coupling at least one cable unit to establish the at least three signal paths among the multi-pin unit, the connector pin and the filter unit; the at least one cable unit establishing the at least signal three signal paths to include at least two audio signal paths for conveying the audio signals and at least one ground path; and (d) operating the filter unit to effect filtering of at least one predetermined signal component from the at least two audio signal paths.

It is, therefore, a feature of the present invention to provide an apparatus and method for conveying audio signals from an input locus to an output locus that presents improved sound at an auxiliary sound unit and experiences reduced interference from electromagnetic audio noise present in the environment.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
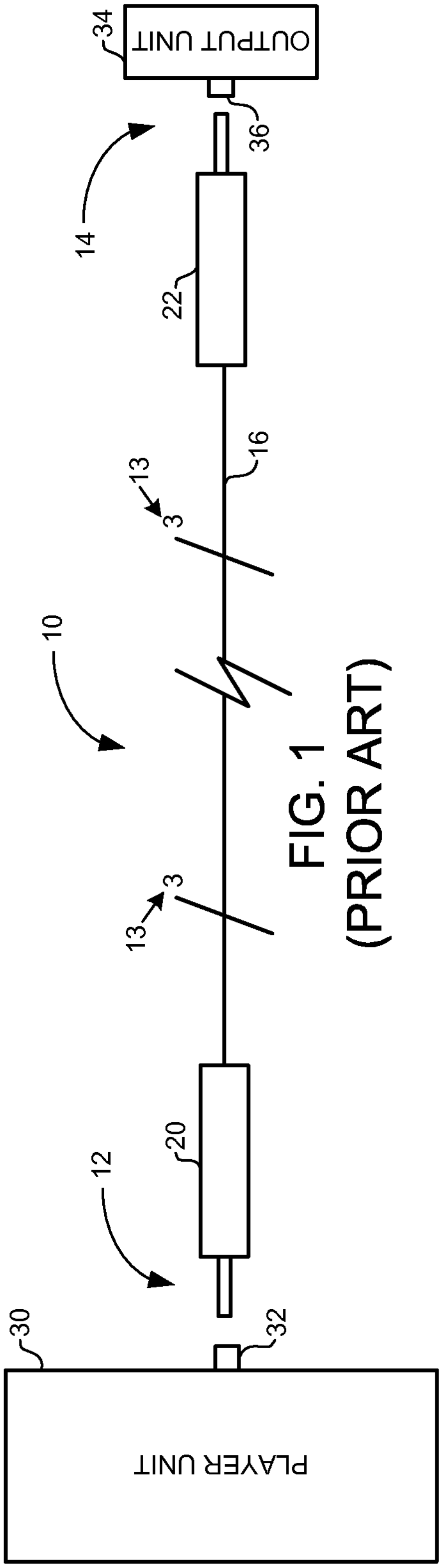
FIG. 1 (PRIOR ART)
FIG. 1 is a schematic drawing of a prior art apparatus for conveying audio signals from an input locus to an output locus.

FIG. 1 is a schematic drawing of a prior art apparatus for conveying audio signals from an input locus to an output locus. In FIG. 1, a connecting apparatus 10 is configured for conveying audio signals from an input locus 12 to an output locus 14 via a cable unit 16. As may be understood by those skilled in the art of audio system design, cable unit 16 may include a plurality of conducting members (not shown in detail FIG. 1; indicated at 13). By way of example and not by way of limitation, cable unit 16 may include three conducting members: one conducting member for conveying right channel stereo music signals, one conducting member for conveying left channel stereo music signals and one conducting member for ground. Cable unit 16 is terminated at a single-pin connector 20 at input locus 12. Single-pin connector 20 is configured for effecting electrical connection with an audio player unit 30 via a player output structure 32. Cable unit 16 is terminated at a single-pin connector 22 at output locus 14. Single-pin connector 22 is configured for effecting electrical connection with an output unit 34 via signal input structure 36.

Figure 2:
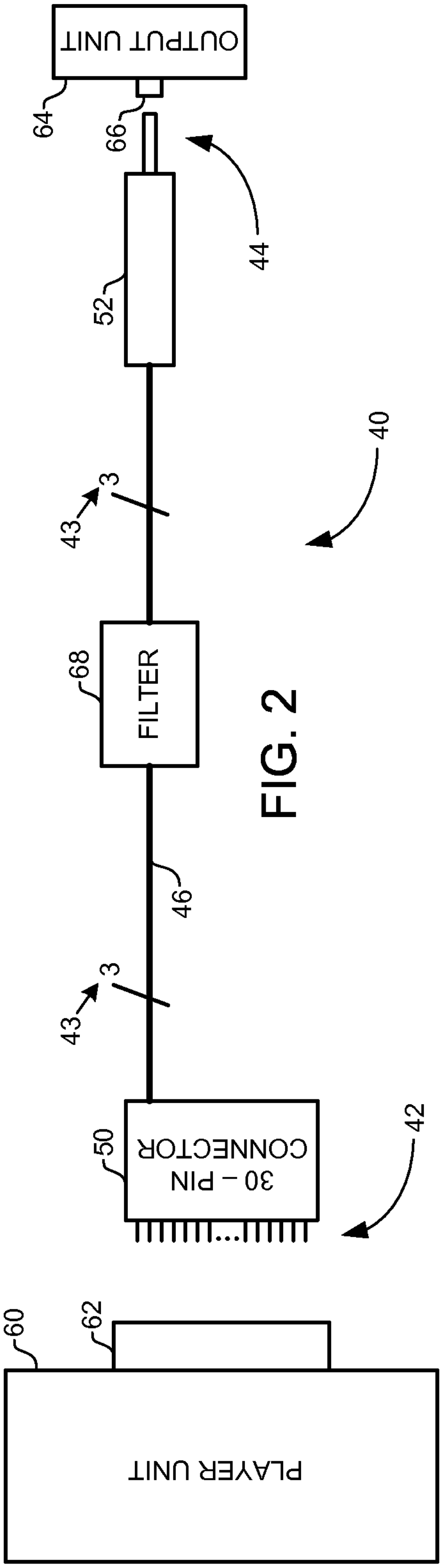
FIG. 2 is a schematic drawing of a first embodiment of an apparatus configured according to the teaching of the present invention for conveying audio signals from an input locus to an output locus.

FIG. 2 is a schematic drawing of a first embodiment of an apparatus configured according to the teaching of the present invention for conveying audio signals from an input locus to an output locus. In FIG. 2, a connecting apparatus 40 is configured for conveying audio signals from an input locus 42 to an output locus 44 via a cable unit 46. As may be understood by those skilled in the art of audio system design, cable unit 46 may include a plurality of conducting members (not shown in detail FIG. 2; indicated at 43). By way of example and not by way of limitation, cable unit 46 may include three conducting members: one conducting member for conveying right channel stereo music signals, one conducting member for conveying left channel stereo music signals and one conducting member for ground. Cable unit 46 is terminated at a multi-pin connector 50 at input locus 42. Multi-pin connector 50 is configured for effecting electrical connection with an audio player unit 60 via a player output structure 62. Cable unit 46 is terminated at a single-pin connector 52 at output locus 44. Single-pin connector 52 is configured for effecting electrical connection with an output unit 64 via signal input structure 66.

Connecting apparatus 40 may also include a filter unit 68 coupled substantially in series with cable unit 46. Filter unit 68 is configured for filtering at least one predetermined signal component from signals traversing cable unit 46. By way of example and not by way of limitation, filter unit 68 may effect filtering of signals or noise presented within a bandwidth including electromagnetic audio interference or within a bandwidth including electromagnetic noise generated by an automobile ignition system.

Figure 3:
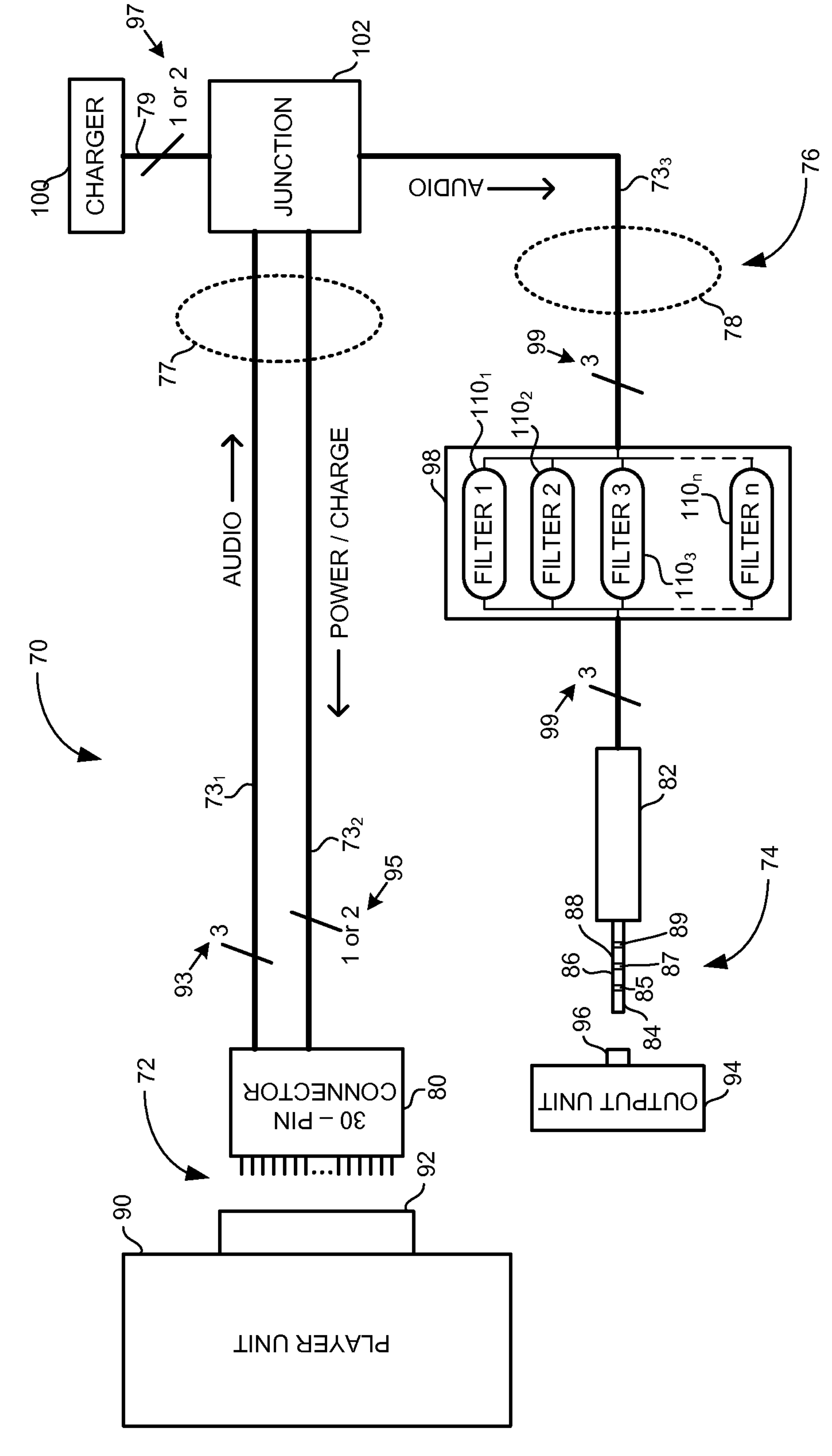
FIG. 3 is a schematic drawing of a second embodiment of an apparatus configured according to the teaching of the present invention for conveying audio signals from an input locus to an output locus.

FIG. 3 is a schematic drawing of a second embodiment of an apparatus configured according to the teaching of the present invention for conveying audio signals from an input locus to an output locus. In FIG. 3, a connecting apparatus 70 is configured for conveying audio signals from an input locus 72 to an output locus 74 via a cable unit 76. As may be understood by those skilled in the art of audio system design, cable unit 76 may include a plurality of cable segments 77, 78, 79. By way of example and not by way of limitation, cable segment 77 may include three conducting members (not shown in detail FIG. 3; indicated at 93): one conducting member for conveying right channel stereo music signals, one conducting member for conveying left channel stereo music signals and one conducting member for ground. Cable unit 76 is terminated at a multi-pin connector 80 at input locus 72. Multi-pin connector 80 is configured for effecting electrical connection with an audio player unit 90 via a player output structure 92. Cable unit 76 is terminated at a single-pin connector 82 at output locus 74.

Single-pin connector 82 is configured for effecting electrical connection with an output unit 94 via signal input structure 96. Single-pin connector 82 may be configured to present a plurality of signal paths in a single-pin configuration. By way of example and not b way of limitation, single-pin connector 82 may present a first signal path at a pin segment 84, may present a second signal path at a pin segment 86 and may present a third signal path at a pin segment 88. Pin segments 84, 86 may be separated by an insulated segment 85. Pin segments 86, 88 may be separated by an insulated segment 87. Pin segment 88 may be separated from the remainder of the single-pin structure of single-pin connector 82 by an insulated segment 89.

Connecting apparatus 70 may also include a charger unit 100 coupled via cable segment 79 and via a junction unit 102 with cable segments 77, 78. Charger unit may be embodied, by way of example and not by way of limitation, in a cigarette lighter apparatus for insertion into a cigarette lighter receptacle or similar receptacle in an automobile to provide a charging current to connecting apparatus 70. To effect such charging, cable segments 77, 79 may include one or two conducting members, indicated in FIG. 3 at 95, 97. The conducting members at 95, 97 may include a charge line and a ground line. In an alternative arrangement, charger unit 100 may share a ground line with audio conducting members in cable segment 77 so that only one conducting member may be included in conducting member 95. Individual conducting members 93, 95, 97 are not illustrated in detail in FIG. 3 because such details are understood by those skilled in the art of audio system design. Details of structure of junction unit 102 for separating various conducting members of cable unit 76 are not illustrated in detail in FIG. 3 as those details are known by those skilled in the art of audio system design.

A portion of cable unit 76, embodied in cable segment 78, is coupled with junction unit 102 and with single-pin connector 82, with filter unit 98 coupled substantially in series with cable segment 78. By way of example and not by way of limitation, cable segment 78 may include three conducting members (not shown in detail FIG. 3; indicated at 99): one conducting member for conveying right channel stereo music signals, one conducting member for conveying left channel stereo music signals and one conducting member for ground.

Filter unit 98 is configured for filtering at least one predetermined signal component from signals traversing cable unit 76. Filter unit 98 may include a plurality of filters $\mathbf{110}_1$, $\mathbf{110}_2$, $\mathbf{110}_3$, $\mathbf{110}_n$ coupled to effect filtering predetermined frequencies or bandwidths from signals traversing cable segment 78. The indicator “n” is employed to signify that there can be any number of filters in filter unit 98. The inclusion of four filters $\mathbf{110}_1$, $\mathbf{110}_2$, $\mathbf{110}_3$, $\mathbf{110}_n$ in FIG. 3 is illustrative only and does not constitute any limitation regarding the number of filters that may be included in the filter unit of the present invention. By way of example and not by way of limitation, filter unit 98 may effect filtering of signals or noise presented within a bandwidth including electromagnetic audio interference, within a bandwidth including electromagnetic noise generated by an automobile ignition system or within other predetermined bandwidths.

Figure 4:
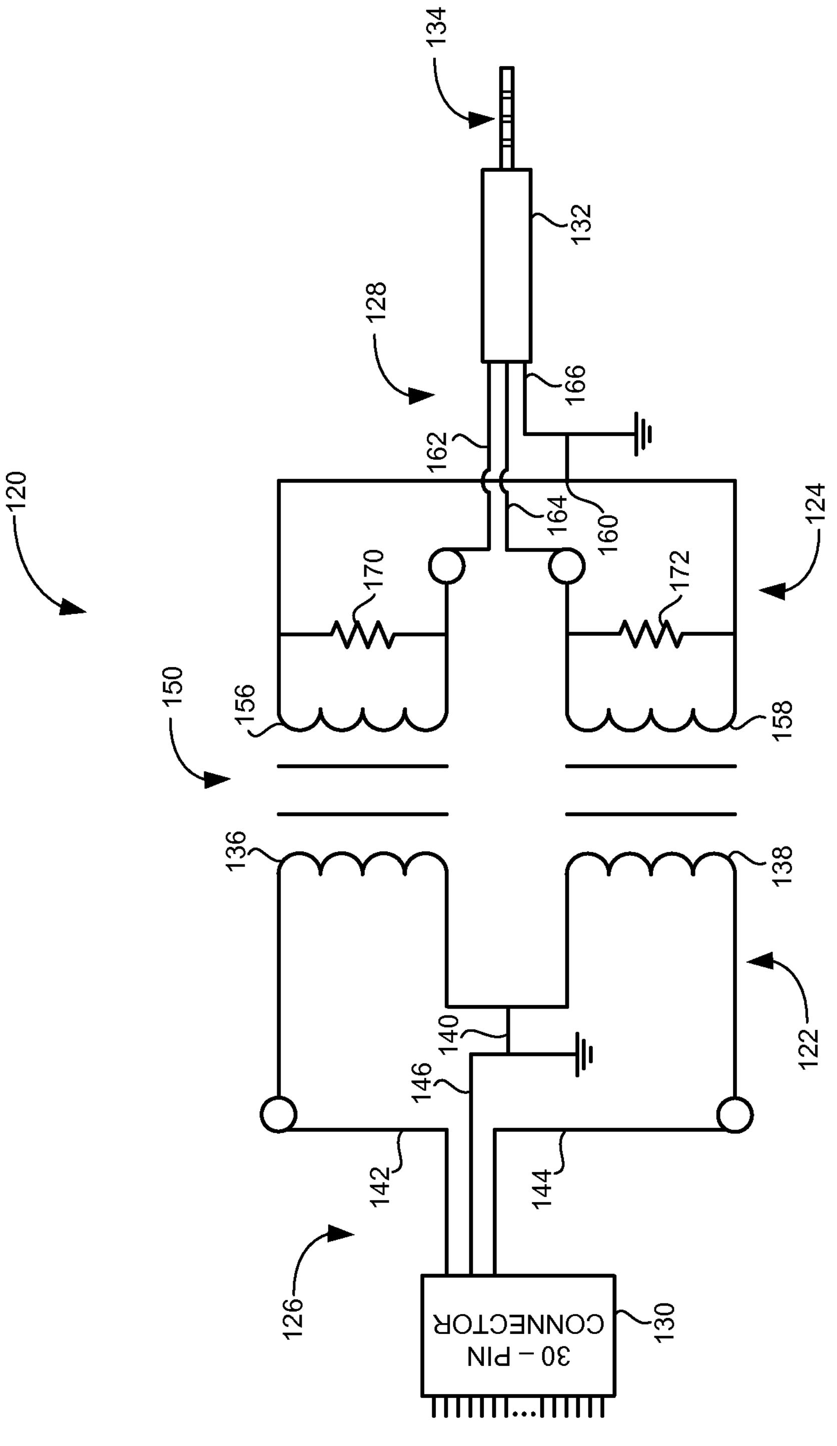
FIG. 4 is a schematic drawing of an exemplary filter that may be employed with the present invention.

FIG. 4 is a schematic drawing of an exemplary filter that may be employed with the present invention. In FIG. 4, a filter 120 includes a first portion 122 coupled with an input locus 126, and a second portion 124 coupled with an output locus 128.

First portion 122 includes a first winding 136 and a second winding 138 coupled at a center tap locus 140. Filter 120 may be configured for coupling with a multi-pin connector 130 presenting a first audio line 142, a second audio line 144 and a ground line 146 from an audio player unit (not shown in FIG. 4; see FIG. 3). First audio line 142 may be coupled with first winding 136, second audio line 144 may be coupled with second winding 138 and ground line 146 may be coupled with center tap locus 140.

Second portion 124 includes a third winding 156 and a fourth winding 158 coupled at an outer tap locus 160. A resistor 170 may be coupled across third winding 156. A resistor 172 may be coupled across fourth winding 158. The turns of windings 136, 138, 156, 158 and the values of resistors 170, 172 affect which bandwidth may be filtered by filter 120, as is understood by those skilled in the art of audio system design.

A core section 150 separates first portion 122 and second portion 124. Core section 150 may be embodied in various materials including, by way of example and not by way of limitation, air, iron or another material.

Filter 120 may be configured for coupling with a single-pin connector 132 receiving signals from first audio line 142 on a first audio line 162, receiving signals from second audio line 144 on a second audio line 164 and coupling ground line 146 with a ground line 166 for presenting to an output unit (not shown in FIG. 4; see FIG. 3) via a plurality of contact segments, indicated generally at 134. A detailed description of the contact segment structure of a single-pin connector is presented in connection with describing FIG. 3. In the interest of avoiding prolixity that description will not be repeated here. First audio line 162 may be coupled with third winding 156, second audio line 164 may be coupled with fourth winding 158 and ground line 166 may be coupled with outer tap locus 160.

Figure 5:
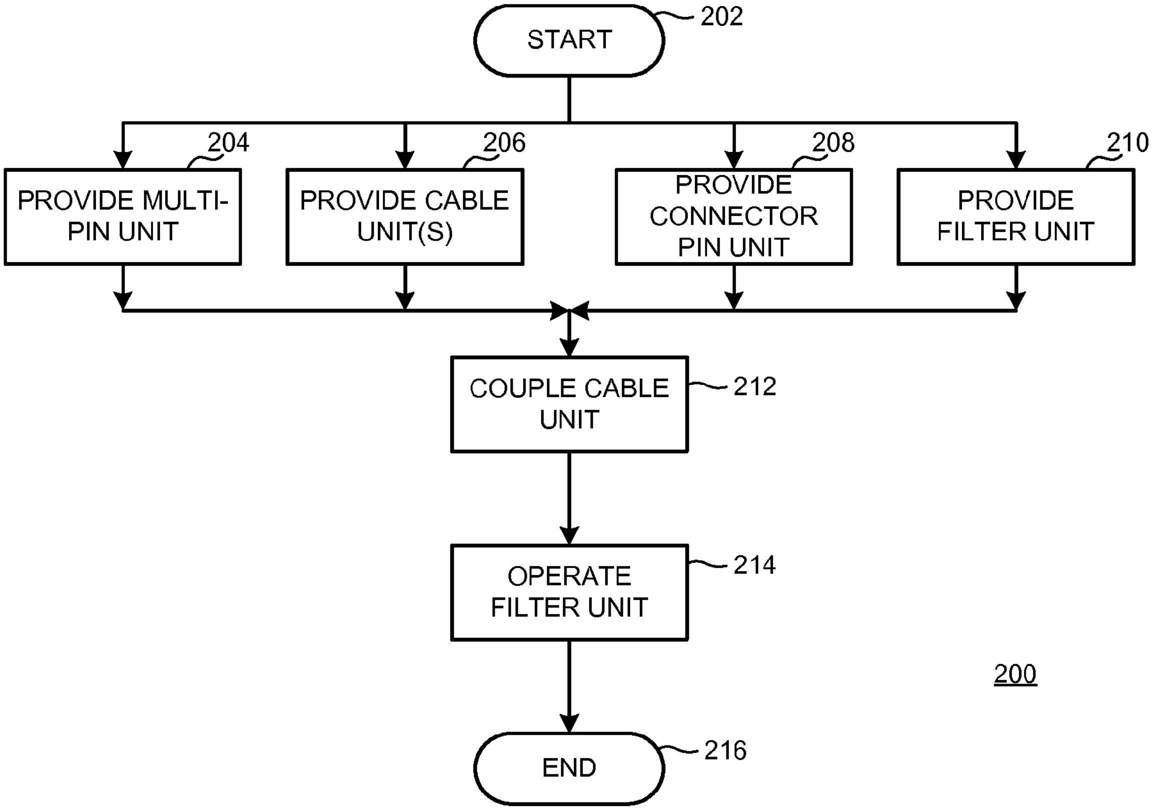
FIG. 5 is a flow chart illustrating the method of the present invention.

FIG. 5 is a flow chart illustrating the method of the present invention. In FIG. 5, a method 200 for conveying audio signals from an input locus to an output locus remote from the input locus begins at a START locus 202.

Method 200 continues with, in no particular order: (1) providing a multi-pin unit configured for receiving least three signal paths at the input locus, as indicated by a block 204; (2) providing at least one cable unit, as indicated by a block 206;

the at least one cable unit presenting the at least three signal paths; (3) providing a connector pin unit, as indicated by a block 208; the connector pin unit presenting the at least three signal paths in a single-pin configuration; and (4) providing a filter unit, as indicated by a block 210.

Method 200 continues with coupling at least one cable unit to establish the at least three signal paths among the multi-pin unit, the connector pin and the filter unit, as indicated by a block 212. The at least one cable unit establishing the at least signal three signal paths to include at least two audio signal paths for conveying the audio signals and at least one ground path.

Method 200 continues with operating the filter unit, as indicated by a block 214, to effect filtering of at least one predetermined signal component from the at least two audio signal paths. Method 200 terminates at an END locus 216.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. An apparatus for conveying audio signals from an input locus to an output locus remote from said input locus; the apparatus comprising:

(a) a multi-pin unit configured for receiving at least three signal paths at said input locus; said at least three signal paths including at least two audio signal paths for conveying said audio signals and at least one ground path;

(b) at least one cable unit coupled with said multi-pin unit; said at least one cable unit substantially spanning an interval between said multi-pin unit and said output locus; said at least one cable unit presenting said at least three signal paths at said output locus;

(c) a connector pin unit coupled with said at least one cable unit at said output locus; said connector pin unit presenting said at least three signal paths in a single-pin configuration; and (d) a filter unit coupled with said at least one cable unit; said filter unit comprising two filter circuits that each include a resistor for filtering at least one predetermined bandwidth of the electromagnetic spectrum from said at least two audio signal paths, and wherein said ground path is continuous from said multi-pin unit to said connector pin unit.

2. The apparatus for conveying audio signals from an input locus to an output locus remote from said input locus as recited in claim 1 wherein the apparatus further comprises a charger unit and a junction unit; said junction unit coupling said charger unit with said multi-pin unit via at least two charging signal paths in said at least one cable unit.

3. The apparatus for conveying audio signals from an input locus to an output locus remote from said input locus as recited in claim 1 wherein said multi-pin unit is a thirty-pin connecting unit.

4. The apparatus for conveying audio signals from an input locus to an output locus remote from said input locus as recited in claim 1 wherein said filter unit is configured as a multi-filter unit presenting a plurality of filters; each respective filter of said plurality of filters effecting filtering of a different respective bandwidth of the electromagnetic spectrum.

5. The apparatus for conveying audio signals from an input locus to an output locus remote from said input locus as recited in claim 4 wherein selected said different bandwidths include electromagnetic audio interference and electromagnetic noise generated by an automobile ignition system.

6. The apparatus for conveying audio signals from an input locus to an output locus remote from said input locus as recited in claim 2 wherein said multi-pin unit is a thirty-pin connecting unit.

7. The apparatus for conveying audio signals from an input locus to an output locus remote from said input locus as recited in claim 2 wherein said filter unit is configured as a multi-filter unit presenting a plurality of filters; each respective filter of said plurality of filters effecting filtering of a different respective bandwidth of the electromagnetic spectrum.

8. The apparatus for conveying audio signals from an input locus to an output locus remote from said input locus as recited in claim 7 wherein selected said different bandwidths include electromagnetic audio interference and electromagnetic noise generated by an automobile ignition system.

9. An apparatus for conveying audio signals from an audio player unit to an output locus remotely located from said audio player unit; the apparatus comprising:

(a) a connecting unit configured for receiving at least three signal paths from said audio player unit; said at least three signal paths including at least two audio signal paths for conveying said audio signals and at least one ground path;

(b) at least one cable unit coupled with said connecting unit; said at least one cable unit substantially spanning an interval between said connecting unit and said output locus; said at least one cable unit presenting said at least three signal paths at said output locus;

(c) an output pin unit coupled with said at least one cable unit at said output locus; said output pin unit presenting said at least three signal paths in a single-pin configuration; and (d) a filter unit coupled with said at least one cable unit; said filter unit comprising two filter circuits that each include a resistor for filtering at least one predetermined bandwidth of the electromagnetic spectrum from said at least two audio signal paths, and wherein said ground path is continuous from said multi-pin unit to said connector pin unit.

10. The apparatus for conveying audio signals from an audio player unit to an output locus remotely located from said audio player unit as recited in claim 9 wherein the apparatus further comprises a charger unit and a junction unit; said junction unit coupling said charger unit with said connecting unit via at least two charging signal paths in said at least one cable unit.

11. The apparatus for conveying audio signals from an audio player unit to an output locus remotely located from said audio player unit as recited in claim 9 wherein said connecting unit is a thirty-pin connecting unit.

12. The apparatus for conveying audio signals from an audio player unit to an output locus remotely located from said audio player unit as recited in claim 9 wherein said filter unit is configured as a multi-filter unit presenting a plurality of filters; each respective filter of said plurality of filters effecting filtering of a different respective bandwidth of the electromagnetic spectrum.

13. The apparatus for conveying audio signals from an audio player unit to an output locus remotely located from said audio player unit as recited in claim 12 wherein selected said different bandwidths include electromagnetic audio interference and electromagnetic noise generated by an automobile ignition system.

14. The apparatus for conveying audio signals from an audio player unit to an output locus remotely located from said audio player unit as recited in claim 10 wherein said connecting unit is a thirty-pin connecting unit.

15. The apparatus for conveying audio signals from an audio player unit to an output locus remotely located from said audio player unit as recited in claim 10 wherein said filter unit is configured as a multi-filter unit presenting a plurality of filters; each respective filter of said plurality of filters effecting filtering of a different respective bandwidth of the electromagnetic spectrum.

16. The apparatus for conveying audio signals from an audio player unit to an output locus remotely located from said audio player unit as recited in claim 15 wherein selected said different bandwidths include electromagnetic audio interference and electromagnetic noise generated by an automobile ignition system.

17. A method for conveying audio signals from an input locus to an output locus remote from said input locus; the method comprising:

(a) in no particular order:
  (1) providing a multi-pin unit configured for receiving least three signal paths at said input locus;
  (2) providing at least one cable unit; said at least one cable unit presenting said at least three signal paths;
  (3) providing a connector pin unit; said connector pin unit presenting said at least three signal paths in a single-pin configuration; and
  (4) providing a filter unit that comprises two filter circuits that each include a resistor;

(b) coupling at least one cable unit to establish said at least three signal paths among said multi-pin unit, said connector pin and said filter unit; said at least one cable unit establishing said at least signal three signal paths to include at least two audio signal paths for conveying said audio signals and at least one ground path, and wherein said ground path is continuous from said multi-pin unit to said connector pin unit; and (d) operating said filter unit to effect filtering of at least one predetermined bandwidth of the electromagnetic spectrum from said at least two audio signal paths.

18. The method for conveying audio signals from an input locus to an output locus remote from said input locus as recited in claim 17 wherein the method further comprises: (e) in no particular order: (1) providing a charger unit; and (2) providing a junction unit; and (f) coupling said charger unit with said multi-pin unit via said junction unit to establish at least two charging signal paths in said at least one cable unit.

19. The method for conveying audio signals from an input locus to an output locus remote from said input locus as recited in claim 18 wherein said filter unit is configured as a multi-filter unit presenting a plurality of filters; each respective filter of said plurality of filters effecting filtering of a different respective bandwidth of the electromagnetic spectrum.

20. The method for conveying audio signals from an input locus to an output locus remote from said input locus as recited in claim 19 wherein selected said different bandwidths include electromagnetic audio interference and electromagnetic noise generated by an automobile ignition system.

* * * * *